L. A. PETERSON.
CHANGE SPEED GEARING.
APPLICATION FILED MAY 27, 1912.

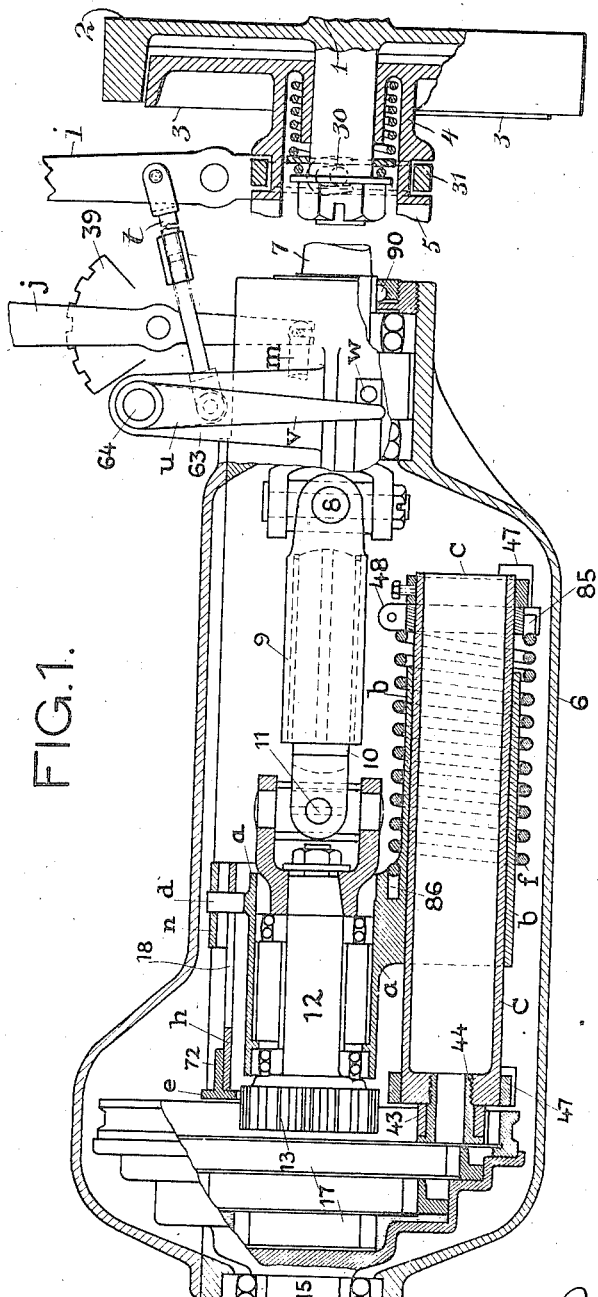

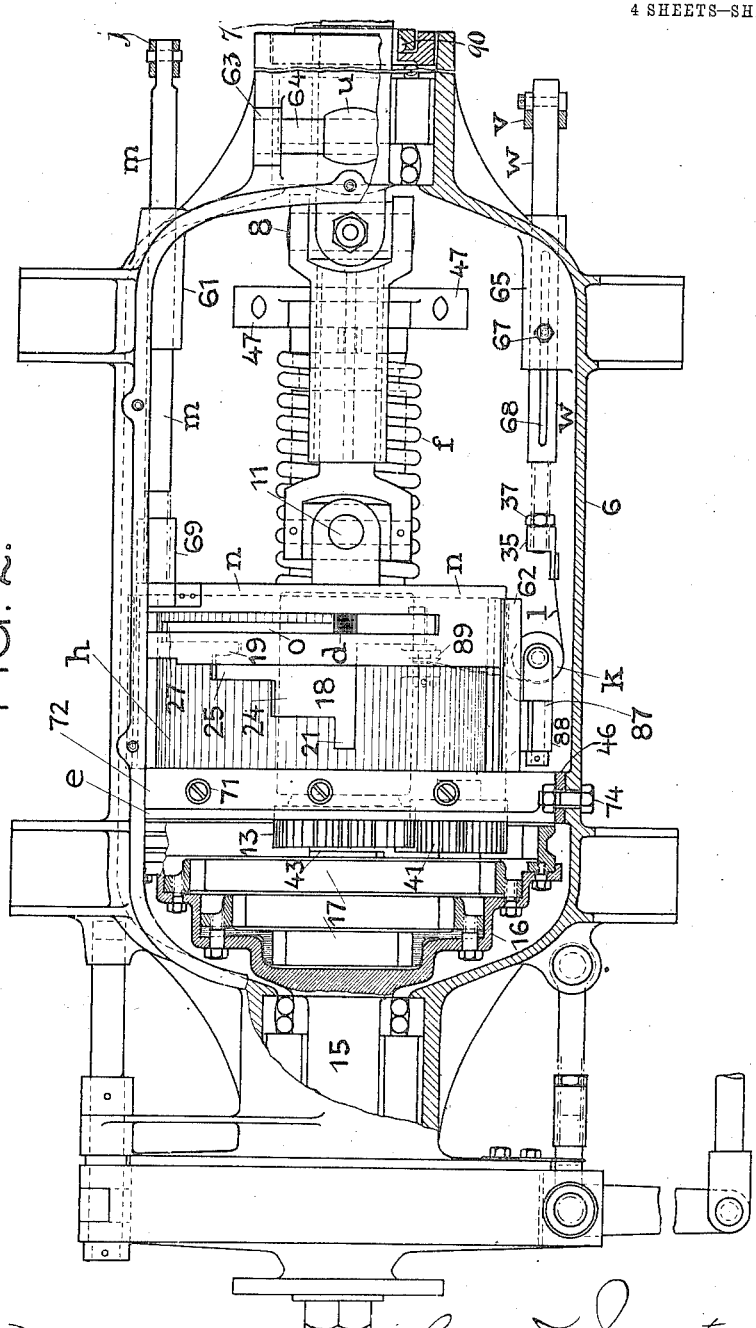

1,051,255.

Patented Jan. 21, 1913.

4 SHEETS—SHEET 3.

Witnesses

Inventor:
Lars August Peterson
by B. Singer
Atty

L. A. PETERSON.
CHANGE SPEED GEARING.
APPLICATION FILED MAY 27, 1912.
1,051,255.
Patented Jan. 21, 1913.
4 SHEETS—SHEET 4.
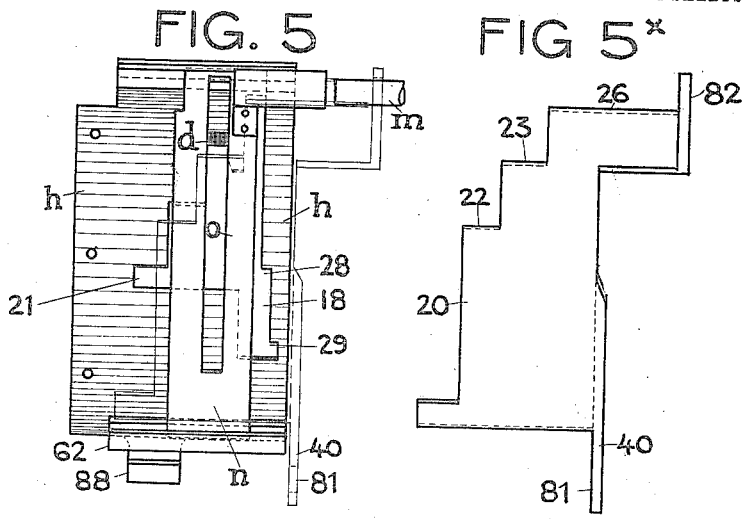
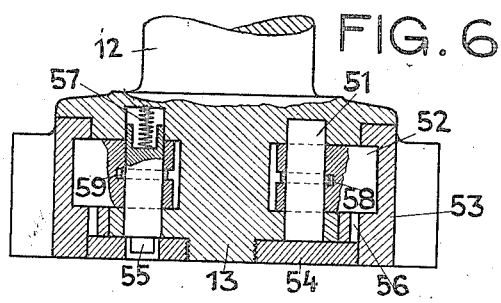
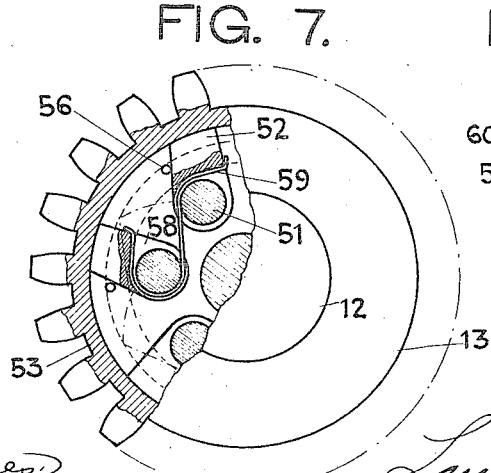

UNITED STATES PATENT OFFICE.

LARS AUGUST PETERSON, OF STOCKHOLM, SWEDEN.

CHANGE-SPEED GEARING.

1,051,255.  Specification of Letters Patent.  Patented Jan. 21, 1913.

Application filed May 27, 1912. Serial No. 700,114.

*To all whom it may concern:*

Be it known that I, LARS AUGUST PETERSON, a subject of the King of Sweden, residing at Stockholm, in the Kingdom of Sweden, have invented a new and useful Change-Speed Gearing, of which the following is a specification.

The invention relates to a change-speed gearing for automobiles, motor boats and the like and particularly of the kind where a gear fixed on a swinging and extensible shaft is adapted to engage a series of co-axial gears, one by one, on another shaft so as to rotate this shaft at different speed.
The object is to simplify and solidify the construction and to afford a gearing of this kind which can readily be applied with great advantage and without considerable change of parts to automobiles now in use.
According to the present invention said swinging and extensible shaft is mounted in an arm which swings on and is slidable along a fixed shaft and actuated by a spring, the arm having a stud or projection which is adapted to engage recesses on a fixed plate curved and concentric with the fixed shaft so as to adjust the arm and keep it in the proper working positions with or without the aid of a movable locking plate.
One end of the swinging shaft is connected to a driving shaft by a universal joint and the other end has a bearing in the arm, the shaft being adapted to rotate but not to move endwise relatively the bearing. The shaft may have another universal joint near the bearing so as to admit of the end portion, which is placed in the bearing, being kept parallel to the driving shaft. If only one universal joint is used the bearing must be swingable not only with the arm but also relatively to the arm. When two universal joints are used the bearing is not shiftable relatively to the arm.

Figure 4:
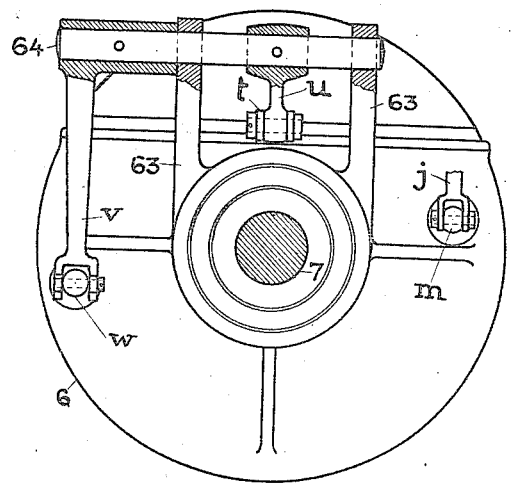
Figure 3:
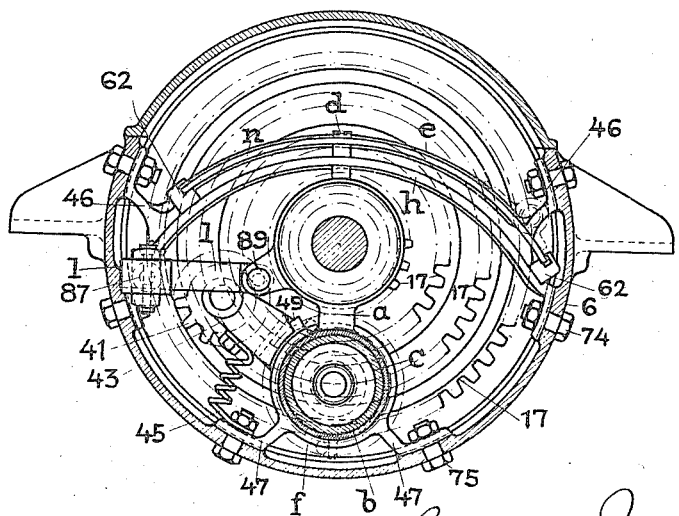

In the drawings, which show an example with two universal joints, Figure 1 is a vertical longitudinal sectional view, partly in section. Fig. 2 is a horizontal sectional view partly in elevation with the top or lid of the casing removed. Fig. 3 vertical cross section. Fig. 4 end view partly in section. Figs. 5–8 show details; Figs. 6 and 7 to a larger scale.

The motor shaft 1 drives, by means of the common cone coupling 2, 3 the shaft 4, which by means of the clutch coupling 5 drives the shaft 7. This shaft has bearing in the one end of casing 6 which incloses the gearing so as to exclude dust. By universal joint 8 the shaft 7 is connected to an extensible shaft. This consists of two parts 9, 10 which are movable along each other and coöperate by means of slot and key so as to partake in the rotation. By universal joint 11 the part 10 is connected to a shaft 12 which has bearings in the arm *a*. This arm has a long nave *b* which is passed on a fixed shaft *c* so that the arm can move along said shaft and also swing around it. Keyed on the free end of shaft 12 is a gear or pinion 13 which is adapted to engage, one by one, the gears 17 fixed coaxially on a shaft 15. This shaft has bearings in the end of casing 6 and transmits motion to an automobile or boat in any well known manner.

A spiral spring *f*, passed on the nave *b* and engaging the arm *a* (at 86) and the shaft *c* or another fixed part (at 85) moves the arm *a* to the left of Fig. 1 so as to extend the shaft 9—10, and swings the arm *a* to the right of Fig. 3 so that the pinion 13 will engage one of the gears 17. The proper positions of pinions 13 is obtained and maintained by a radial stud *d* on arm *a* which engages a slot in a fixed plate *h* which is curved and coaxial with the fixed shaft *c*. The plate *h* has four such recesses 21, 24, 25, 27 in the left edge (Fig. 2) of an opening 18 in said plate, and these recesses correspond to the four working positions of pinion 13 for driving forward, the concentric gears 17 of shaft 15 being four in number in the instance shown in the drawing. When the stud *d* rests on the bottom of recess 21 the pinion 13 engages the central gear 17 which has the same diameter as pinion 13 so as to be driven with the same speed. The other gears 17 are larger and impart reduced speeds.

To move and swing the arm *a* against the pressure of spring *f* levers or pedals may be used, which should be connected with the common clutch so as to open the clutch before disengaging the pinion 13. In the instance illustrated on the drawing a pedal *i* and a lever *j* are shown. Movement of the pedal will swing the arm *a* to the left, Fig. 3, so as to disengage the pinion 13 from the gears 17. The lever *j* is adapted to move the arm *a* and thereby the pinion 13 in axial direction. For this purpose the lever engages a rod $m$ movable lengthwise in a guide 61 and rigidly connected to a curved plate $n$ which slides in axial guides 62 and has a slot $o$ which engages the stud $d$.

The connection between pedal $i$ and arm $a$ consists of a link $t$, a crank shaft 64, with cranks $u$ and $v$ (said shaft being mounted in uprights 63 on the casing 6), a rod $w$ movable lengthwise in a guide 65 and a steel band $l$ guided by a roller $k$ and connected to arm $a$ at 89.

The forked lower end of pedal $i$ engages a stud or studs 30 on a ring 31 which engages an annular groove on shaft 4 so as to release the clutch member 3. The connection between pedal $i$ and arm $a$ should be adjusted so that the member 3 is released ere the arm $a$ is pulled. For this purpose the band $l$ is connected to a nut 35 screwed on a threaded portion of rod $w$ so as to adjust by rotating the rod, a nut 37 serving as lock for nut 35. A screw pin 67 engaging a groove 68 on rod $w$ prevents rotation of the rod after the adjustment is done. Or the link $t$ may consist of two parts connected by a right- and link-threaded nut 66 so as to effect the adjustment by rotating said nut.

The rod $m$ is screwed into a nut 69 so as to adjust the connection between lever $j$ and plate $n$ by rotating the rod.

To bring the pinion 13 from one gear 17 to another the arm $a$ should be moved both axially and sidewise, and the pedal should be actuated at first so as to open the clutch before disengaging the pinion.

The spring $f$ keeps the stud $d$ in position in the recesses 21, 24, 25, 27 so as to keep the pinion 13 engaged with the gears 17. The right edge of opening 18 has two recesses 28, 29, Fig. 5, for the stud $d$, corresponding to the resting and backing positions. In these recesses the stud $d$ is held by the movable plate $n$, which prevents axial movement, the recesses being adapted to prevent movement in peripheral direction. The plate $n$ is locked in desired position by means of the usual bolt (not shown) mounted on lever $j$ and adapted to engage the notches on the fixed segment 39. In Figs. 1 and 2 the pinion 13 is in the resting position. When stud $d$ has the position shown in Fig. 5, the pinion 13 engages the third gear 17.

If the spring $f$ be mounted so as to only swing the arm $a$ and not to move it axially, projections 19 Fig. 2, may be formed on plate $h$ at each of the recesses 24, 25 so as to guide the stud $d$ on both sides when it is moving into said recesses. When using a weak spring $f$, which is not able to keep the pinion engaged without failure, a curved locking plate 40 (shown in Fig. 5 and separately in Fig. 5×) may be used for preventing undesired disengagement. This plate should be movable axially and may be placed for instance between plates $h$ and $n$ so as to be guided along the edges of the guides 62 and may be connected to rod $w$ for instance between two nuts which jam a lug 81 of the plate passed on rod $w$. If not otherwise guided the plate may have another lug 82 adapted to slide on rod $m$. A spring (not shown) tends to push the plate in locking position. In such position the edges 22, 23 and 26 obstruct the passage of stud $d$ when said stud occupies the recesses 24, 25, 27, so that disengagement is impossible, unless the locking plate 40 be withdrawn by actuating the pedal. As the disengagement is effected by the same pedal, the length of band $l$ should be adjusted so as to become slack in the resting position to such an extent that the plate 40 be withdrawn ere the band is strained.

The backing is rendered possible by using an intermediate gear 41. This is mounted in a forked arm 43 extending radially from the fixed shaft $c$ and adapted to engage the pinion 13 and the largest gear 17. The arm 43 swings on an axial stud 44 on end of shaft $c$ and is pressed against a fixed stop 49 by means of a spring 45 so as to normally keep the gear 41 disengaged from gear 17.

The plate $h$ is fixed to a flange 62 on a curved support $e$ by screws 71 or the like. The ends 46 of said support are forked and are anchored by bolts 74. The shaft $c$ is fixed in supports 47, which are anchored by bolts 75.

The roller $k$ is mounted in the forked end of a pivot 87, which has bearing in a projection 88 of the guide 62, so that the roller can adjust its position according to the varying direction of band $l$.

One end of spring $f$ being connected to a jam-ring 48, Fig. 1, the tension of the spring may be adjusted both axially and circularly by moving the ring along the shaft $c$ and by rotating it on said shaft.

When throwing the pinion 13 into engagement with a larger gear 17 while the automobile is running, it may happen that this gear, because of its greater peripheral speed at first operates on the pinion and on the clutch member 3 connected therewith, so that the pinion will momentarily check the running, causing a jerk or jog. Figs. 6 and 7 show a construction adapted to avoid this inconvenience. Here the pinion has a loose rim 53 which is actuated by frictional dogs 52 swingable on pivots 51 and engaging the inner smooth side of rim 53 either from centrifugal force or from the action of springs 59 entering recesses 58, the dogs being so measured in length that they form an angle with a radius passing through their pivots so as to be able to yield when the rim 53 tends to rotate with higher speed than the shaft 12. The dogs are placed in a peripheral groove on the body of pinion 13 and may also enter an inside groove on rim 53 if desired. A nut 54 screwed on a central stud on said body keeps the pivots and rim in place. A stud 55 on one of the pivots enters a hole in the nut so as to prevent unscrewing, a spring 57 keeping the stud in engagement with said hole. The holes 56 facilitate detachment of the rim with the aid of a key having pins adapted to enter said holes so as to bring the dogs in the dotted positions, Fig. 7, when the rim is rotated. The springs 59 may be common for two dogs as shown. Fig. 8 shows a shaft provided with a similar device, so that one part of the shaft is allowed to rotate with greater speed than the other. The two parts of the shaft are shown connected by a flanged nut 60.

The gears or rims 17 are fixed on a step-disk 16 by bolts or the like so as to admit of each gear being detached separately.

At both ends of the casing 6 are packings 90 to exclude dust.

While I have herein shown and described one form of my invention I do not wish to be limited thereto except for such limitations as the claims may import.

I claim:

1. A change speed gear mechanism comprising in combination, a plurality of gears of different sizes, a sectional driving shaft comprising a section held to a fixed axis of rotation, a second section composed of axially extensible shaft members keyed to each other against independent rotation, a universal joint connecting one shaft member with said first section, a third shaft section having a universal connection with the remaining shaft member of said second section, a driving pinion on said third section, and a bearing mechanism axially and rotatively shiftable about a fixed axis for supporting said third section and engaging the pinion thereof with said gears, substantially as described.

2. A change speed gear mechanism comprising in combination, a plurality of gears of different sizes, a driving shaft comprising a section held to a fixed axis of rotation, a second and axially extensible section having a universal connection with said first section, a third section having a universal connection with said second section, a pinion on said third section, and bearing mechanism axially and rotatively adjustable about a fixed axis for supporting said third section and engaging the pinion thereof with any one of said gears, substantially as described.

3. A change speed gear mechanism comprising in combination, a plurality of gears of different sizes, a driving shaft comprising a section held to a fixed axis of rotation, a second and axially extensible section having universal connection with said first section, a third section having universal connection with said second section, a pinion on said third section, a bearing mechanism axially and rotatively adjustable about a fixed axis and supporting said third section, and a spring for axially and rotatively moving said mechanism, substantially as described.

4. A change speed gear mechanism comprising in combination, a plurality of gears, a driving shaft composed of first, second and third sections having universal connection with each other, a driving pinion on the third section, means for shifting the third section laterally and axially to engage the pinion with any one of said gears, said means having a stud, and a member provided with recesses for locking said stud to hold said pinion in mesh with the selected gear, substantially as described.

5. A change speed gear mechanism comprising in combination, a plurality of gears, a driving shaft, a pinion on said shaft, bearing mechanism for said shaft movable axially and rotatively about a fixed axis and having a slot engaging portion, a slidably mounted member provided with a slot receiving said portion and arranged and disposed to permit rotative movement of said mechanism, and means for sliding said member to shift said mechanism axially, substantially as described.

6. A change speed gear mechanism comprising in combination, a plurality of gears, a driving shaft, a pinion on said shaft, bearing mechanism for said shaft movable axially and rotatively about a fixed axis and having a stud, a slidably mounted curved plate having the center of its curvature coincident with the axis of said mechanism and provided with a slot for receiving the stud of said mechanism to permit rotative adjustment of the mechanism, means for rotatively shifting said mechanism, and means engaging said plate to slide the same and axially shift said mechanism to engage said pinion with any one of said gears, substantially as described.

7. A change speed gear mechanism comprising in combination, a plurality of gears, a driving shaft and a pinion thereon, means for shifting said shaft to engage the pinion with any one of said gears, and devices connecting the drive shaft and pinion to rotate the pinion at a speed equal to the shaft and permit free rotation of the pinion in one direction at a speed exceeding the speed of the shaft, substantially as described.

8. A change speed gear mechanism comprising in combination, a plurality of gears, a driving shaft, a pinion on said shaft, a fixed shaft, a reversing or intermediate gear movably mounted on said fixed shaft in the plane of one of said gears adapted to be moved into mesh engagement therewith, a bearing for said drive shaft axially and rotatively shiftable on said fixed shaft, and devices for axially and rotatively shifting said bearing to bring said pinion into mesh with any one of said first named gears or with said reversing gear, substantially as described.

In testimony whereof I have signed my name to this specification in the presence of two subscribing witnesses.

LARS AUGUST PETERSON.

Witnesses:
R. LARSSON,
L. ANDERSON.